3,681,100
LIGHT STABLE ORANGE PIGMENT BASED ON QUINACRIDONE SOLID SOLUTION
Edward E. Jaffe, Union, N.J., assignor to E. I. du Pont de Nemours and Company, Wilmington, Del.
No Drawing. Filed Oct. 8, 1970, Ser. No. 79,306
Int. Cl. C08h 17/14
U.S. Cl. 106—288 Q          2 Claims

ABSTRACT OF THE DISCLOSURE

Solid solutions are produced consisting essentially of linear quinacridone (QA), 4,11-dichloroquinacridone (4,11-dichloro-QA), quinacridonequinone (QAQ), and dihydroquinacridone (DQA).

BACKGROUND OF THE INVENTION

Solid solutions of various quinacridone derivatives are known in the art and are disclosed in U.S. 3,160,510 and U.S. 3,298,847. By suitable selection of the derivatives, numerous attractive colors such as golds, yellows and maroons have heretofore been produced. The production of solid solutions having an orange shade, however, has been more difficult especially in regard to achieving suitable levels of lightfastness. It will be understood that the problem of lightfastness becomes progressively more severe upon reducing the concentration of pigment in pigmented finishes, e.g., automotive finishes. Additives, e.g., nickel carbonate, are known to improve the lightfastness of finishes containing quinacridone pigments, but such an improvement is usually accompanied by a severe loss in humidity resistance.

SUMMARY OF THE INVENTION

In accordance with the invention there is provided a pigment consisting essentially of a solid solution of the following quinacridone derivatives, the percentages given being on a weight basis: (a) 40 to 50 percent of linear quinacridone, (b) 25 to 35 percent of 4,11-dichloroquinacridone, (c) 3 to 20 percent of 6,13-dihydroquinacridone, and (d) 10 to 25 percent of quinacridonequinone. This pigment has an attractive orange color, a high level of lightfastness, and outstanding humidity resistance.

The solid solutions of the invention are advantageously produced in accordance with the method of U.S. Pat. 3,607,336, filed July 9, 1969, the disclosure of which is incorporated herein by reference. According thereto, a sulfuric acid solution of the quinacridone derivatives is drowned in highly turbulent water to form a precipitate with a particle size smaller than 0.5 micron, followed by digestion of the precipitate at a temperature from about 40° C. to the boil for about 10 minutes to about 2 hours. For purposes of the present invention, the solution is initially formed by dissolving in sulfuric acid the four components in the appropriate weight ratios.

In carrying out the high turbulence precipitation technique of U.S. Pat. 3,607,336, adjustments can be made to increase or lower the temperature rise which occurs on mixing water with the sulfuric acid solution. In general, the greater the increase in temperature rise or the higher the acid concentration in the effluent slurry, the greater will be the tendency to produce larger size pigment particles.

Following precipitation of the pigment particles, the slurry is digested at an elevated temperature to effect solid solution formation and growth of the particles to the desired dimensions. Thereafter a surfactant may optionally be added to improve dispersibility of the quaternary solid solution.

Advantageously the pigment particles will have an average particle size less than 0.1 micron. In this form the pigment exhibits a high degree of transparency, as is needed for pigmentation of metallized automotive finishes. Most significantly, the pigments of this invention also afford outstanding lightfastness even when incorporated in relatively low concentrations in such metallized finishes.

The invention will be described further in the following examples, in which the detail is given by way of illustration and not by way of limitation. Parts therein are by weight unless otherwise indicated.

Example I

To 1 kg. of 96–98% sulfuric acid are added the following pulverized materials:

|  | G. |
|---|---|
| DQA | 10 |
| 4,11-dichloro QA | 29.7 |
| QA | 44.5 |
| QAQ | 15.7 |

During the addition the temperature is not allowed to rise above 25–30° C. On continued stirring the solid goes into solution. When complete solution is attained, as determined by microscopic examination, the solution is subjected to high turbulence drowing in which it is introduced continuously through a small orifice into the center of a stream of 25° C. water flowing under pressure through a constricted tube. The flow of water and sulfuric acid solution is set to produce an effluent at 53° C., hence giving a temperature rise of 28° C. The volume of the effluent is about 6 liters. The resulting suspension is agitated and heated to about 90° C. and digested at 90° C. for 1 hour, during which time solid solution formation occurs. Then, after cooling to about 85° C., a solution of 5 g. isopropylamine salt of a C–12 substituted benzenesulfonic acid surfactant dissolved in 20 ml. perchloroethylene is added to the stirred suspension. The temperature is slowly raised to 95° C. allowing the perchloroethylene to steam distil out. The temperature is maintained for 1¼ hours. The solid is removed by hot filtration, followed by washing with 60–70° C. water until the filtrate is free of acid and sulfate ions.

The resulting presscake is reslurried with stirring into about 1 liter of water, heated to 65–70° C. and the pH adjusted to 8–8.5. Heating is continued for 1 hour and the pH rechecked and adjusted as necessary. The solid is filtered directly. The solid is washed with 60–70° C. water until the effluent shows a resistivity close to that of the water used for washing. The presscake is dried at about 80° C. and pulverized.

The orange pigment is highly transparent when incorporated into an automotive finish comprising a thermoplastic acrylic lacquer or a thermosetting acrylic enamel. When examined by an electron microscope, the pigment particles are shown to nearly all have a major dimension in the range of 0.02 to 0.08 micron.

The X-ray pattern of this solid solution is distinguished by the following bands:

Intense: 26.6 2θ
Medium: 6.3 2θ; 12.8 2θ; 13.2 2θ; 24.4 2θ; 25.6 2θ
Low: 8.4 2θ; 14.0 2θ

As compared to an X-ray pattern of a physical mixture of the same components, some bands of individual components are completely absent in the X-ray pattern of the solid solution, while other bands are shifted due to solid solution formation. It is concluded that essentially all of each of the components has entered into the solid solution.

A control is prepared according to the foregoing procedure but omitting the DQA. The parts of the other components in the resulting solid solution are as follows: QA is 49.5, QAQ is 17.5 and 4,11-dichloro QA is 33.

A portion of the above pigments is incorporated into a thermoplastic acrylic lacquer. Sprayed panels are prepared using the pigments in combination with both flake aluminum for metallic effect and with white extender for tint. In each case the pigment sample is extended by the use of 50% aluminum flake, and by 95% titanium dioxide.

Panels prepared using lacquer comprising the pigment of Example I are compared with panels of the control pigment. The panels are exposed in Florida for 6 months with a 5° south exposure and are graded for change in color using an arbitrary scale of units from 0 through 10, 0 indicating complete failure and 10 indicating perfect stability of color.

|  | 50% pigment, 50% aluminum | 5% pigment, 95% $TiO_2$ |
|---|---|---|
| Example I | 10 | 8 |
| Control | 7 | 6 |

At these low pigmentation concentrations, the quaternary solid solution of Example I provides remarkably improved stability as compared to the control in which DQA is omitted.

Example II

The procedure of Example I is repeated in all essential details except that the sulfuric acid, before addition of quinacridone derivatives, is combined with 113 grams toluene followed by heating for ½ hour at 65°–70° C. to convert the toluene to toluene-sulfonic acid.

The resultant pigment is similar in all respects to that of Example I, including X-ray diffraction pattern. When incorporated in an automotive finish it exhibited a slightly reduced transparency but more yellowish shade of orange.

What is claimed is:

1. A light stable orange pigment consisting essentially of a solid solution of the following components, the percentages given being on a weight basis: (a) 40 to 50 percent of linear quinacridone, (b) 25 to 35 percent of 4,11-dichloroquinacridone, (c) 3 to 20 percent of 6,13-dihydroquinacridone, and (d) 10 to 25 percent of quinacridonequinone.

2. A pigment according to claim 1 in the form of particles having an average particles size less than 0.1 micron.

References Cited

UNITED STATES PATENTS

| 3,160,510 | 12/1964 | Ehrich | 106—288 Q |
| 3,298,847 | 1/1967 | Hanke et al. | 106—288 Q |

TOBIAS E. LEVOW, Primary Examiner

J. V. HOWARD, Assistant Examiner